(12) United States Patent
Hinz

(10) Patent No.: US 10,442,474 B2
(45) Date of Patent: Oct. 15, 2019

(54) CONFIGURABLE CARGO RACK SYSTEM INTEGRATED INTO THE BED OF A PICK-UP TRUCK

(71) Applicant: Krystian Hinz, Robbinsville, NJ (US)

(72) Inventor: Krystian Hinz, Robbinsville, NJ (US)

( * ) Notice: Subject to any disclaimer, the term of this patent is extended or adjusted under 35 U.S.C. 154(b) by 87 days.

(21) Appl. No.: 15/807,506

(22) Filed: Nov. 8, 2017

(65) Prior Publication Data

US 2019/0135353 A1 May 9, 2019

(51) Int. Cl.
*B62D 33/02* (2006.01)
*B62D 33/077* (2006.01)
*B62D 33/08* (2006.01)
*B62D 33/027* (2006.01)
*B60R 9/00* (2006.01)

(52) U.S. Cl.
CPC .......... *B62D 33/0207* (2013.01); *B60R 9/00* (2013.01); *B62D 33/0273* (2013.01); *B62D 33/077* (2013.01); *B62D 33/08* (2013.01)

(58) Field of Classification Search
CPC ... B62D 33/0207; B62D 33/08; B62D 33/077
USPC .................................................. 296/3, 37.7
See application file for complete search history.

(56) References Cited

U.S. PATENT DOCUMENTS

| | | | |
|---|---|---|---|
| 2,947,566 A * | 8/1960 | Tower ................. | B60P 3/42 |
| | | | 211/182 |
| 4,659,131 A | 4/1987 | Flournoy, Jr. | |
| 5,037,152 A | 8/1991 | Hendricks | |
| 5,152,570 A | 10/1992 | Hood | |
| 5,303,858 A | 4/1994 | Price | |
| 5,431,472 A | 7/1995 | Coffland | |
| 7,494,169 B2 * | 2/2009 | Collins ................. | B60P 3/40 |
| | | | 296/3 |
| 7,568,748 B2 | 8/2009 | Tarquinio | |
| 10,131,287 B1 * | 11/2018 | Marino ................. | B60R 9/045 |
| 2003/0127875 A1 * | 7/2003 | Hornick ................. | B60P 7/08 |
| | | | 296/32 |
| 2014/0197653 A1 * | 7/2014 | Stepanians .............. | B60R 9/00 |
| | | | 296/3 |
| 2014/0239025 A1 * | 8/2014 | Scott ................. | B60R 9/045 |
| | | | 224/405 |

* cited by examiner

*Primary Examiner* — Jason S Morrow
*Assistant Examiner* — E Turner Hicks
(74) *Attorney, Agent, or Firm* — LaMorte & Associates, P.C.

(57) ABSTRACT

A truck bed assembly that is configured with a collapsible cargo rack. Two rails are provided, which include a first rail and a second rail. A first set of extendable supports a first rail above a first sidewall. A second set of extendable supports a second rail above a second sidewall. A first crossbeam is connected to the first rail at a first pivot connection. The first crossbeam can be selectively rotated about the first pivot connection from a first position that is parallel to the first rail, to a second position that is perpendicular to the first rail. Also, a second crossbeam is connected to the first rail at a second pivot connection. The second crossbeam can be selectively rotated about the second pivot connection from a first position that is parallel to the second rail to a second position that is perpendicular to the second rail.

15 Claims, 4 Drawing Sheets

CONFIGURABLE CARGO RACK SYSTEM INTEGRATED INTO THE BED OF A PICK-UP TRUCK

BACKGROUND OF THE INVENTION

1. Field of the Invention

In general, the present invention relates to cargo racks that are designed to attach to the bed of a pick-up truck. More particularly, the present invention relates to cargo racks that are collapsible and expandable, therein enabling the cargo rack to be integrated into the structure of the pick-up truck.

2. Prior Art Description

Pick-up trucks are very useful for moving objects, provided those objects can fit into the bed of the pick-up truck. Depending upon the make and model of the pick-up truck, the size of the truck bed can vary by several square feet. However, even the largest models of pick-up trucks rarely have a truck bed that is over eight feet long.

There are many objects, such as ladders, planks of lumber, and the like, that are longer than the truck bed of a typical pick-up truck. If a person desires to transport such items in a pick-up truck, accommodations have to be made for the long object. The most typical accommodation made to a truck is the addition of cargo rack. A cargo rack is a rigid framework that sits in the bed of the pick-up truck. The framework is taller than the cab of the truck. Consequently, long items such as ladders and lumber can be attached to the cargo rack, so that the items extend over the cab of the truck.

The primary problem with a cargo rack for a pick-up truck is that it is difficult to install and remove. Many models of cargo racks require that the cargo rack be bolted to elements in the truck's bed or to the underlying frame. Accordingly, once a cargo rack is installed it is rarely removed. The presence of the cargo rack affects the aesthetics of the pick-up truck. Furthermore, the cargo rack may also serve as a hindrance in the loading and unloading of materials, such as loose dirt or gravel. The presence of the cargo rack prevents loose material from being dumped directly into the bed of the truck. Further still, the presence of the cargo rack adversely affects the aerodynamics of a truck and causes an increase in air noise and a decrease in gas mileage.

In an attempt to address the problems associated with pick-up truck cargo racks, cargo racks have been designed that are collapsible. In this manner, they can be moved out of the way when not in use, without having to be detached from the pick-up truck. Such prior art cargo rack systems are exemplified by U.S. Pat. No. 5,303,858 to Price and U.S. Pat. No. 5,037,152 to Hendricks. However, such prior art cargo rack systems have proven difficult to install, difficult to deploy, and have very limited weight capacities.

A need therefore exists for a collapsible cargo rack system for a pick-up truck that is easy to install, easy to operate and robust in its capacity. These needs are met by the present invention as described and claimed below.

SUMMARY OF THE INVENTION

The present invention is a truck bed assembly that is configured with a collapsible cargo rack. The truck bed has a first sidewall and an opposite second sidewall. Each of the side walls has a top ledge. Two rails are provided, which include a first rail and a second rail. A first set of extendable supports are coupled to the first sidewall. The first set of extendable supports retain the first rail above the top ledge of the first sidewall. Likewise, a second set of extendable supports are coupled to the second sidewall. The second set of extendable supports retain the second rail above the top ledge of the second sidewall.

A first crossbeam is connected to the first rail at a first pivot connection. The first crossbeam can be selectively rotated about the first pivot connection from a first position that is parallel to the first rail, to a second position that is perpendicular to the first rail. Also, a second crossbeam is connected to the first rail at a second pivot connection. The second crossbeam can be selectively rotated about the second pivot connection from a first position that is parallel to the second rail to a second position that is perpendicular to the second rail.

In practicing the invention, the rails can be retracted against the top ledges of the truck bed sidewalls when not needed. When a cargo rack is needed, the rails are raised above the top ledges to a height above the cab of the pick-up truck. The crossbeams are then rotated into perpendicular orientations so that each crossbeam extends from one rail to another. The crossbeams are locked in place and the cargo rack is ready for use.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention rack system can be adapted for use in many types of pick-up trucks, the rack system is shown in only one illustrated example. The example shows the rack system applied to a pick-up truck with a standard-length bed. It is understood that other bed lengths and widths exist. However, the illustrated embodiment is selected in order to set forth one of the best modes contemplated for the invention. The illustrated embodiment is merely exemplary and should not be considered a limitation when interpreting the scope of the appended claims.

Figure 1:
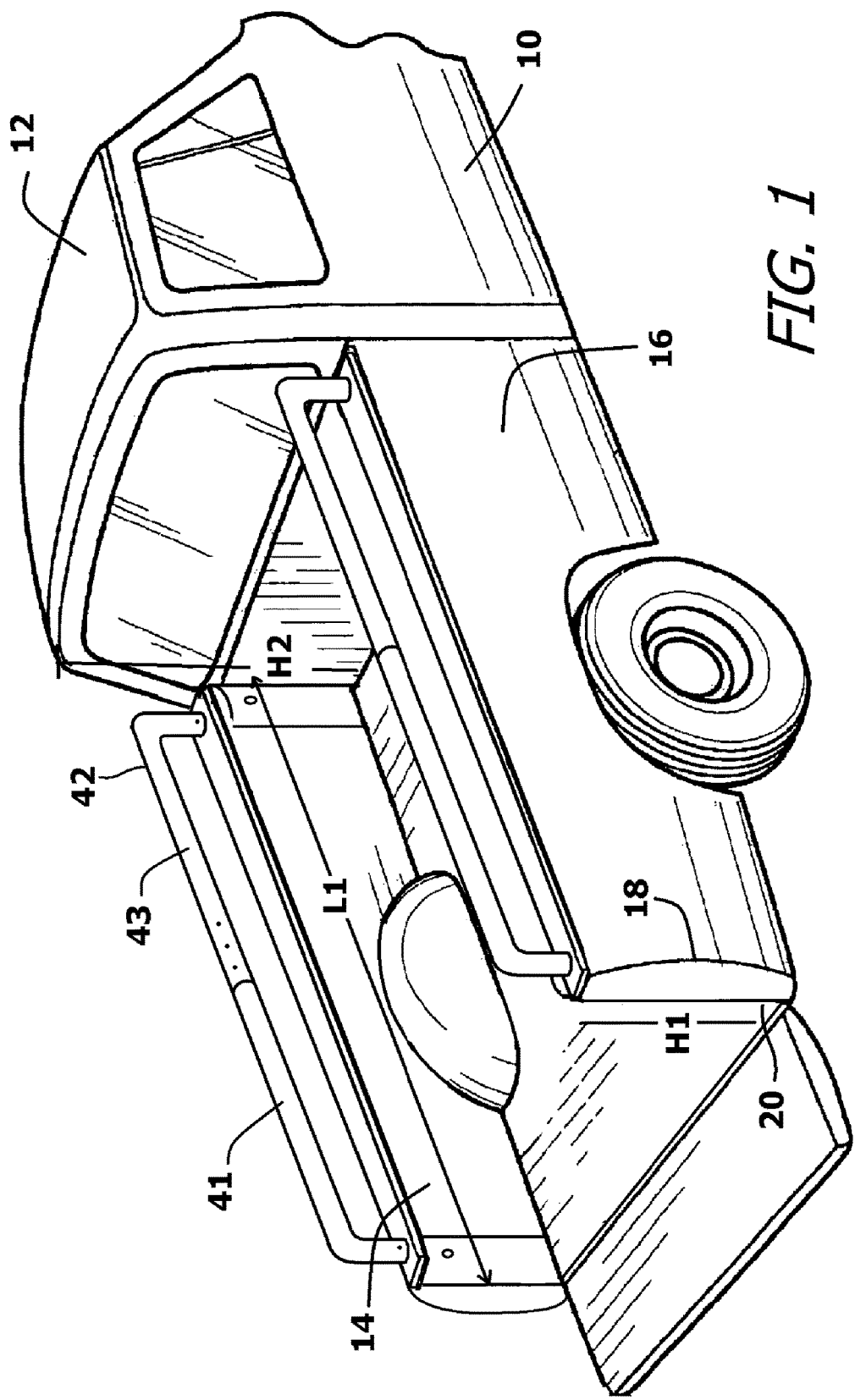
FIG. 1 is a perspective view of an exemplary embodiment of a truck bed assembly with the cargo rack in a stowed configuration.
Figure 2:
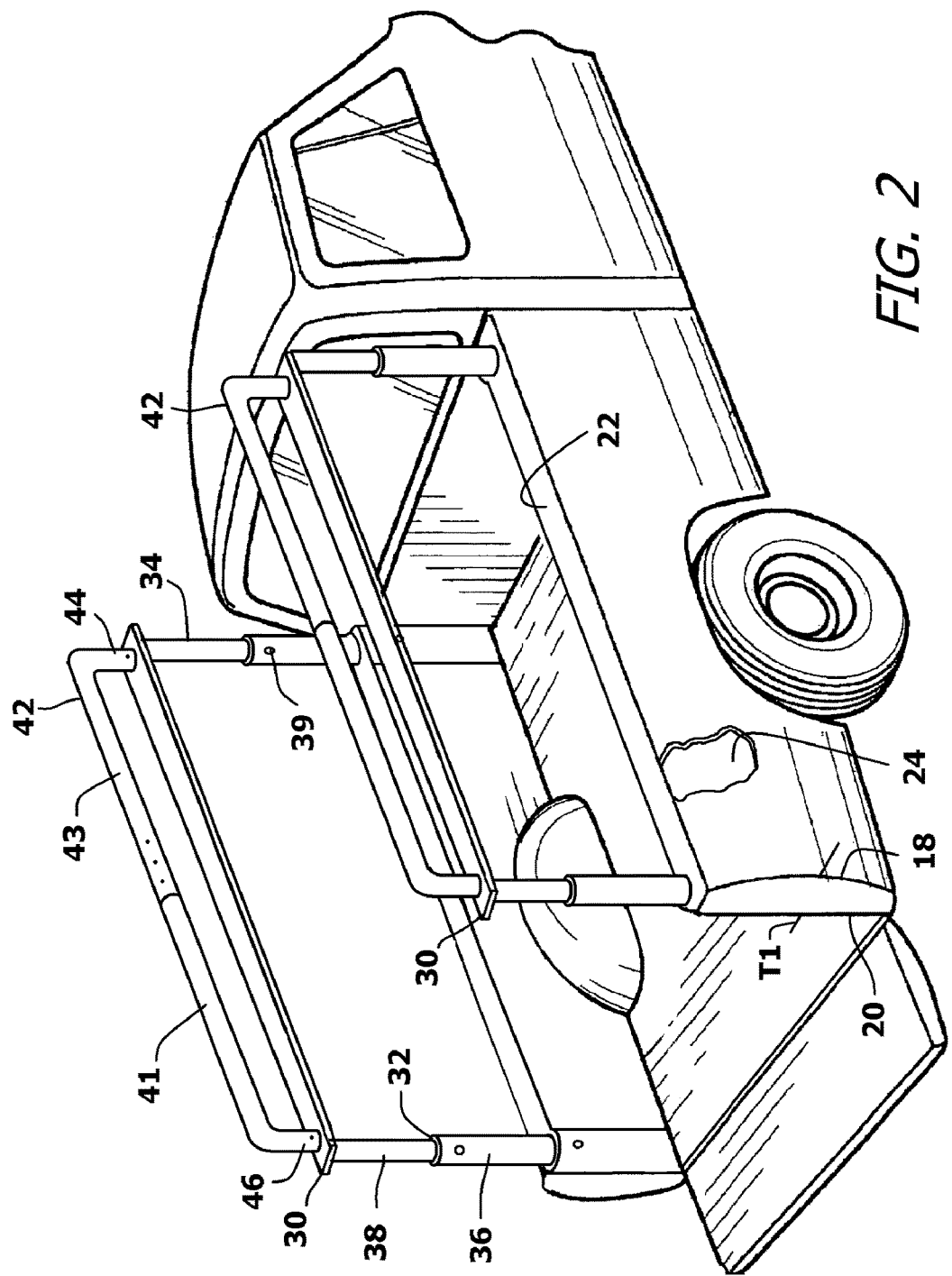
FIG. 2 is a perspective view of the exemplary truck bed assembly with the cargo rack in a partially deployed configuration.
Figure 3:
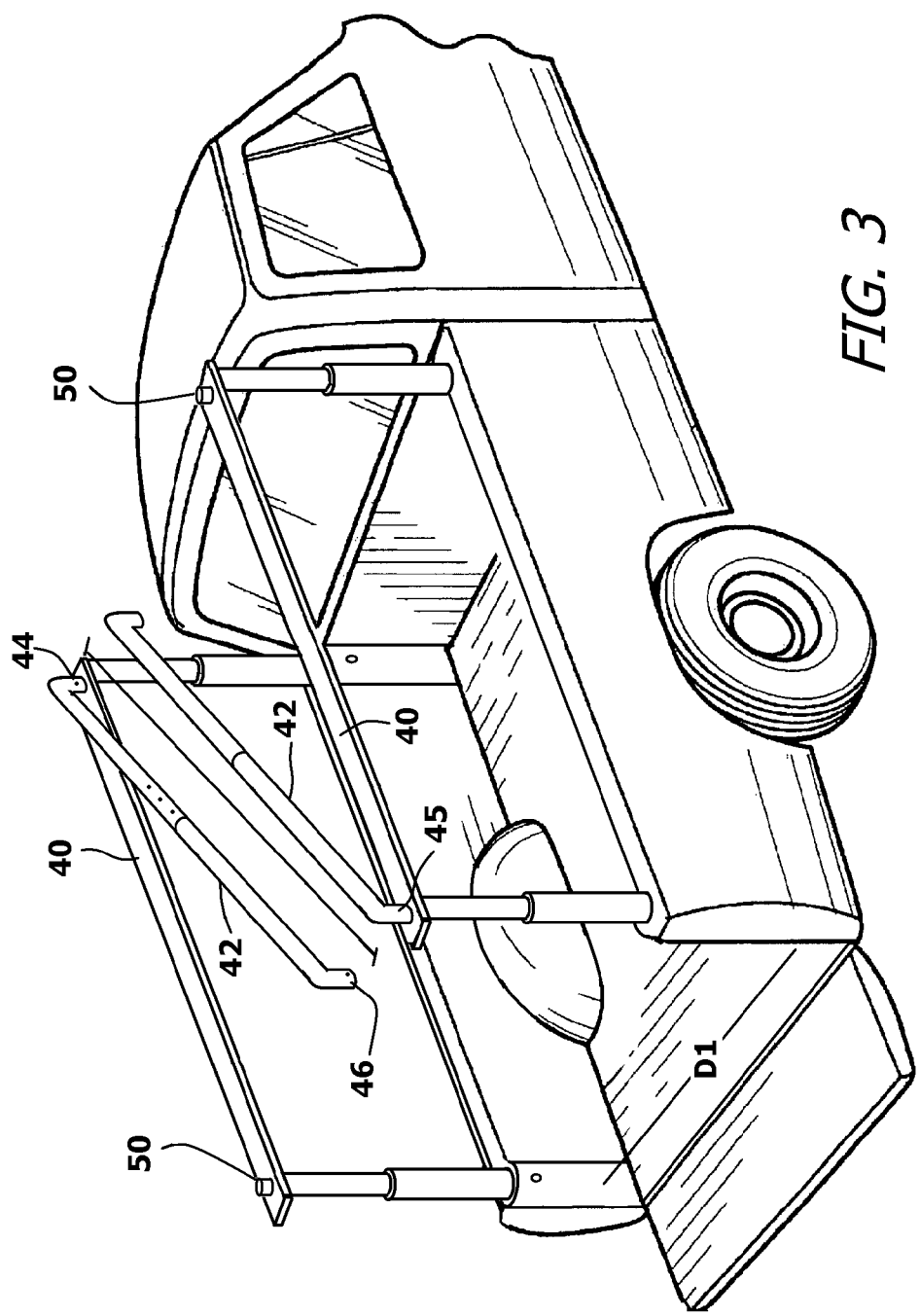
FIG. 3 is a perspective view of the exemplary truck bed assembly with the cargo rack in a partially deployed configuration.

Referring to FIG. 1 in conjunction with FIG. 2 and FIG. 3, a pick-up truck 10 is shown that has a cab 12 and an open truck bed 14. The truck bed 14 has two parallel sidewalls 16. Each sidewall 16 has a length L1 and height H1 that depends upon the make and model of the pick-up truck 10. Additionally, each sidewall 16 is a construct having an outside body panel 18, an inside bed panel 20, and a top ledge 22 that joins the outside body panel 18 to the inside bed panel 20. The thickness T1 of each sidewall 16 depends upon the style of the pick-up truck 10 and the internal space 24 designed between the inside bed panel 20 and the outside body panel 18. The cab 12 is taller than the truck bed 14, wherein the cab 12 extends a second height H2 above the truck bed 14 that is higher than the height H1 of the sidewalls 16.

Two rail assemblies 30 are provided, one for each of the sidewalls 16. Each rail assembly 30 includes two height adjustable supports 32, 34. The adjustable supports 32, 34 are telescopic. Each adjustable support 32, 34 has a base element 36. The base element 36 of the adjustable support is preferably sized to fit within the interior space 24 of each sidewall 16. Accordingly, the base element 36 has a height that is no greater than the height H1 of the sidewalls 16 and a width that is no wider than the space between the outside body panel 18 and the inside bed panel 20 of the sidewall 16. Each adjustable support 32, 34 is positioned vertically within a sidewall 16 and is only accessible through the top ledge 22 of the sidewall 16.

Secondary elements 38 pass into the top of the base element 36 in a telescoping manner. When fully extended, the secondary elements 38 lock into place, using locking detents or similar locking mechanisms 39. When fully extended and locked into place, each of the secondary elements 38 extends to a height at least as high as the height H2 of the cab 12.

The two adjustable supports 32, 34 mounted into each of the sidewalls 16 are used to support a rail 40. Accordingly, there are two rails 40 supported by the four adjustable supports 32, 34. As is shown in FIG. 1, when the adjustable supports 32, 34 are not extended, the rails 40 rest upon the top ledge 22 of the sidewalls 16 and protect the top ledge 22 of the sidewalls 16 from damage. As is shown in FIG. 2, when the adjustable supports 32, 34 are extended, the adjustable supports 32, 34 elevate the rails 40 to a height that is higher than the height H2 of the cab.

Figure 4:
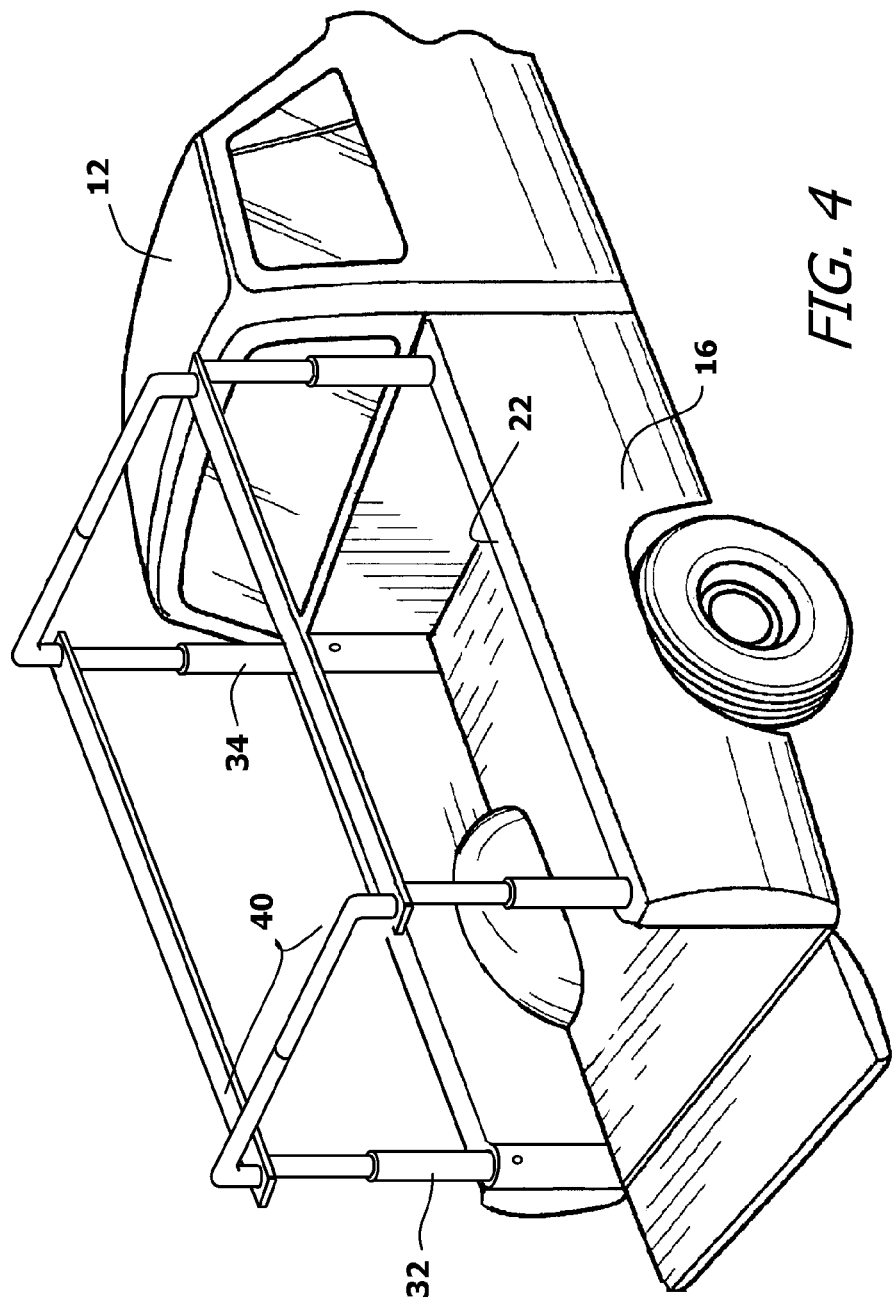
FIG. 4 is a top view of the truck bed assembly with the cargo rack fully deployed.

Referring to FIG. 3 and FIG. 4 in conjunction with FIG. 2, it can be seen that a crossbeam 42 is attached to each of the rails 40. Each crossbeam 42 is made from at least two telescoping sections 41, 43. Accordingly, each crossbeam 42 can be selectively adjusted in length between a first end 44, and a second end 46. Each crossbeam 42 is attached to its rail 40 at a pivot connection 45 at one end. The pivot connection 45 enables the crossbeam 42 to rotate upon the rail 40. In this manner, each crossbeam 42 can be selectively manipulated between a first position that is parallel to the rail 40 (FIG. 2) and a second position that is perpendicular to the rail 40 (FIG. 4). In the illustrated embodiment, the crossbeams 42 are smooth tubes. However, it will be understood that each crossbeam 42 can have numerous configurations and may include some tie-down structures 41 that can be used to engage ropes and strapping.

Each crossbeam 42 has a pivot connection 45 at one end. The distance between the pivot connection 45 and the opposite end of the crossbeam 42 may be longer or shorter than the distance D1 between the two rails 40. The two telescoping sections 41, 43 are adjusted to accommodate the distance. In this manner, it will be understood that when the crossbeam 42 is oriented perpendicular to one rail 40, the crossbeam 42 will span the gap between the rails 40. This is shown in FIG. 4.

Locking mechanisms 50 are disposed on each rail 40. The locking mechanisms 50 engage the second end 46 of the crossbeams 42. When the crossbeam 42 is oriented to be parallel to the rail 40, one locking mechanism 50 can engage the second end 46 of the crossbeam 42 and lock it into that orientation. Likewise, when the crossbeam 42 is oriented to be perpendicular to the rail 40, then the second end 46 of the crossbeam 42 can contact a locking mechanism 50 on the opposite rail 40. The locking mechanism 50 engages the crossbeam 42 and locks the crossbeam 42 into its perpendicular orientation.

Referring now to all previously referenced figures, it will be understood that a set of rail assemblies 30 are installed into the bed 14 of a pick-up truck 10. This can be done either by a manufacturer or an aftermarket supplier. The rail assemblies 30 provide two rails 40 that cover and protect sections of the top ledge 22 on the sidewalls 16 of the truck bed 14. The rails 40 both provide physical protection from contact damage and provide structures to anchor ropes and strapping when securing a load into the truck bed 14.

When the operator of the truck 10 needs an elevated cargo rack, the operation extends the four adjustable supports 32, 34. This elevates the rails 40 to a height that is above the height of the cab 12. If crossing elements are needed, the user unlocks the crossbeams 42 and rotates the crossbeams 42 ninety degrees. The crossbeams 42 span the gap between the rails 40 and lock into place. See FIG. 4. Long items, such as ladders and lumber can then be placed atop the crossbeams 42 and secured to the crossbeams 42 and the rails 40 for transport by the pick-up truck 10.

It will be understood that the embodiment of the present invention that is illustrated and described is merely exemplary and that a person skilled in the art can make many variations to those embodiments. All such embodiments are intended to be included within the scope of the present invention as defined by the claims.

What is claimed is:

1. A truck bed assembly, comprising:
a first sidewall having a first top ledge;
a second sidewall set a first distance apart from said first sidewall, wherein said second sidewall has a second top ledge;
a first rail;
a second rail;
a first set of extendable supports coupled to said first sidewall, wherein said first set of extendable supports are adjustable between a first support position where said first rail rests upon said first rail and a second support position where said first rail is elevated above said first top ledge;
a second set of extendable supports coupled to said second sidewall, wherein said second set of extendable supports are adjustable between a lower support position where said second rail rest upon said second rail and a higher support position where said second rail is elevated above said second top ledge;
a first crossbeam supported by said first rail, said first crossbeam having a first end and an opposite second end, wherein said first end is connected to said first rail at a first pivot connection, wherein said first crossbeam can be selectively rotated about said first pivot connection from a first orientation that is parallel to, and above, said first rail to a second orientation that is perpendicular to said first rail; and
a first locking mechanism that locks said second end of said first crossbeam to said second rail as said first crossbeam reaches said second orientation.

2. The assembly according to claim 1, further including a second locking mechanism on said second rail that engages said first crossbeam and locks said first crossbeam into said second orientation.

3. The assembly according to claim 2, wherein said first crossbeam has an adjustable length.

4. The assembly according to claim 2, further including a second crossbeam connected to said second rail at a second pivot connection, wherein said second crossbeam can be selectively rotated about said second pivot connection from a parallel orientation that is parallel to said second rail to a perpendicular orientation that is perpendicular to said second rail.

5. The assembly according to claim 4, wherein said second locking mechanism on said second rail engages said second crossbeam and locks said second crossbeam into said parallel orientation.

6. The assembly according to claim 4, wherein said first locking mechanism on said first rail engages said second crossbeam and locks said second crossbeam into said perpendicular orientation, wherein said second crossbeam spans said first distance between said first sidewall and said second sidewall.

7. The assembly according to claim 4, wherein said second crossbeam has an adjustable length.

8. A truck bed assembly, comprising:
a first sidewall having a first top ledge;
a second sidewall set a first distance apart from said first sidewall, wherein said second sidewall has a second top ledge;
a first rail subassembly coupled to said first sidewall that include a first rail and a first set of adjustable support elements that selectively support said first rail at different elevations above said first top ledge;
a second rail subassembly coupled to said second sidewall that includes a second rail and a second set of adjustable support elements that selectively support said second rail at different elevations above said second top ledge; and
a first crossbeam connected to said first rail at a first pivot connection that enables said first crossbeam to rotate between a first orientation and a second orientation, wherein in said first orientation said first crossbeam is parallel to, and above, said first rail, and wherein in said second orientation said first crossbeam is perpendicular to said first rail, wherein said first crossbeam extends between said first rail and said second rail in said second orientation.

9. The assembly according to claim 8, further including a first lock to lock said first crossbeam in said first orientation.

10. The assembly according to claim 9, further including a second lock to lock said crossbeam in said second orientation.

11. The assembly according to claim 8, further including a second crossbeam that is coupled to said second rail, wherein said second crossbeam is selectively positionable between a parallel orientation that is parallel to said second rail and a perpendicular orientation, wherein said second crossbeam extends between said first rail and said second rail.

12. The assembly according to claim 11, wherein said second crossbeam is adjustable in length.

13. A truck bed sidewall assembly, comprising:
an outside body panel;
an inside bed panel, wherein an internal space exists between said outside body panel and said inside bed panel;
a top ledge extending from said outside body panel to said inside bed panel;
a rail that extends over at least part of said top ledge;
adjustable support elements for selectively elevating said rail above said top ledge, wherein said support elements are retractable into said internal space between said outside body panel and said inside bed panel;
a crossbeam connected to said rail with a pivot connection, wherein said pivot connection enables said crossbeam to be selectively adjustable between a first orientation, where said crossbeam is parallel to, and above, said rail, and a second orientation, where said crossbeam is perpendicular to said rail.

14. The assembly according to claim 13, wherein said rail is adjustable in length.

15. The assembly according to claim 13, further including a lock on said rail that selectively locks said crossbeam in said first orientation.

* * * * *